United States Patent
Liang et al.

(10) Patent No.: US 10,479,528 B1
(45) Date of Patent: Nov. 19, 2019

(54) NETWORK OF DISTRIBUTED DRONE SYSTEM AND PARKING PADS

(71) Applicants: Ping Liang, Newport Coast, CA (US); Biyonka Liang, Newport Coast, CA (US)

(72) Inventors: Ping Liang, Newport Coast, CA (US); Biyonka Liang, Newport Coast, CA (US)

(73) Assignee: Ping Liang, Newport Coast, CA (US)

( * ) Notice: Subject to any disclaimer, the term of this patent is extended or adjusted under 35 U.S.C. 154(b) by 0 days.

(21) Appl. No.: 16/182,558

(22) Filed: Nov. 6, 2018

(51) Int. Cl.
| | |
|---|---|
| *B64F 1/36* | (2017.01) |
| *G07C 9/00* | (2006.01) |
| *G06Q 20/10* | (2012.01) |
| *H02J 7/02* | (2016.01) |
| *G05D 1/10* | (2006.01) |
| *B64F 1/00* | (2006.01) |
| *B64F 1/28* | (2006.01) |
| *H04W 4/44* | (2018.01) |
| *B60L 53/14* | (2019.01) |
| *B60L 53/12* | (2019.01) |
| *B60L 53/80* | (2019.01) |
| *B60L 53/66* | (2019.01) |
| *H02J 7/00* | (2006.01) |

(52) U.S. Cl.
CPC ............. *B64F 1/362* (2013.01); *B60L 53/12* (2019.02); *B60L 53/14* (2019.02); *B60L 53/665* (2019.02); *B60L 53/80* (2019.02); *B64F 1/005* (2013.01); *B64F 1/28* (2013.01); *G05D 1/102* (2013.01); *G06Q 20/10* (2013.01); *G07C 9/00103* (2013.01); *H02J 7/025* (2013.01); *H02J 7/027* (2013.01); *H04W 4/44* (2018.02); *B60L 2200/10* (2013.01); *H02J 2007/0001* (2013.01)

(58) Field of Classification Search
None
See application file for complete search history.

(56) References Cited

U.S. PATENT DOCUMENTS

| | | | |
|---|---|---|---|
| 9,387,928 B1 | 7/2016 | Gentry et al. | |
| 9,937,808 B2 * | 4/2018 | Evans | B60L 11/1825 |
| 10,112,728 B2 * | 10/2018 | Evans | B64F 1/36 |
| 2013/0019925 A1 * | 1/2013 | Britcher | H02S 20/00 136/251 |
| 2015/0162867 A1 * | 6/2015 | Meringer | H02S 20/20 362/183 |
| 2016/0117929 A1 * | 4/2016 | Chan | G06Q 30/04 701/3 |

(Continued)

*Primary Examiner* — Curtis J King
(74) *Attorney, Agent, or Firm* — Guosheng Wang; United States Research and Patent Firm

(57) ABSTRACT

This invention discloses a distributed parking system for drones comprising a network of parking pads for drones distributed over a geographic area, each of which comprising a parking surface of one or more parking spots on which a drone can land and park securely, a power refill module that replenish the power source of a parked drone, a control module that controls functions of the parking pad, and a communication module through which the control module is connected to a communication network; and a master controller that controls functions of the parking pads and communicates commands to and receives reports from the parking pads through the communication network.

21 Claims, 6 Drawing Sheets

(56) References Cited

U.S. PATENT DOCUMENTS

| | | | |
|---|---|---|---|
| 2016/0117933 A1* | 4/2016 | Chan | G08G 5/0069 |
| | | | 705/317 |
| 2016/0159496 A1* | 6/2016 | O'Toole | B64F 1/32 |
| | | | 244/110 E |
| 2016/0185466 A1* | 6/2016 | Dreano, Jr. | G06Q 30/0635 |
| | | | 705/26.81 |
| 2017/0015415 A1* | 1/2017 | Chan | B64C 39/024 |
| 2017/0028863 A1* | 2/2017 | Meringer | F21S 8/085 |
| 2017/0039861 A1* | 2/2017 | Ceribelli | G05D 1/0005 |
| 2017/0045894 A1* | 2/2017 | Canoy | G05D 1/0676 |
| 2017/0313421 A1* | 11/2017 | Gil | H04W 4/70 |
| 2017/0336061 A1* | 11/2017 | Riedel | B64C 39/024 |
| 2017/0344000 A1* | 11/2017 | Krishnamoorthy | B64C 39/024 |
| 2017/0369184 A1* | 12/2017 | Di Benedetto | B64F 1/00 |
| 2018/0093768 A1* | 4/2018 | Castleman | B64C 39/024 |
| 2018/0184051 A1* | 6/2018 | Watanabe | H04N 5/247 |
| 2018/0265098 A1* | 9/2018 | Evans | B61B 3/02 |
| 2018/0290764 A1* | 10/2018 | McMillian | B64D 45/04 |
| 2018/0320402 A1* | 11/2018 | Evans | E04H 14/00 |
| 2019/0047462 A1* | 2/2019 | Vijayaraghavan | B60P 3/11 |
| 2019/0139421 A1* | 5/2019 | Nilsson | B64C 39/024 |

\* cited by examiner

US 10,479,528 B1

NETWORK OF DISTRIBUTED DRONE SYSTEM AND PARKING PADS

FIELD OF INVENTION

This invention relates generally to a system of distributed drones and parking pads on which the drones can park and receive power refill.

BACKGROUND

All powered drones, including battery powered drones and gasoline powered drones, have limited flight range due to need to recharge, re-fuel or exchange of power source. Battery powered drones especially have limited flight range and/or time due to limited battery capacity and high power consumption. Another factor limiting the application of drones is the response time. When a drone service is needed at a location in a matter of seconds or minutes, if a drone has to fly from a far away location, the response time may be tens of minutes, thus too late. No prior art exists that solve these limitations.

BRIEF DESCRIPTION OF DRAWINGS

Abbreviations used in the following list of drawings are defined in the next section which provides the detailed description of the embodiments of the invention.

SUMMARY OF THE INVENTION

Figure 1:
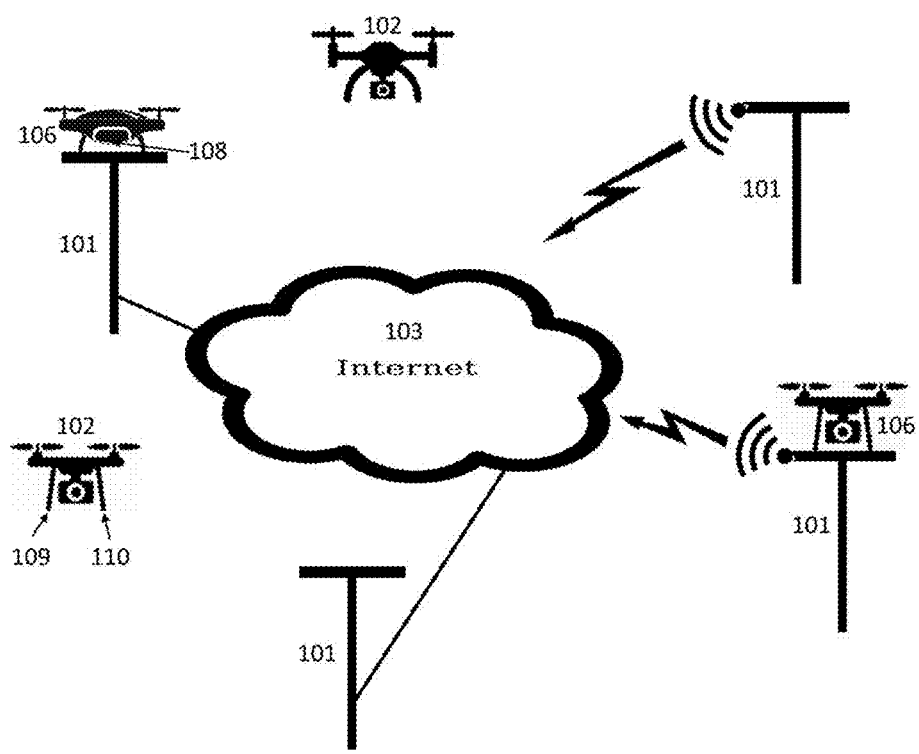
FIG. 1 shows a network of distributed parking pads for drones wherein the parking pads are distributed over a geographic area to provide parking and power recharge service to drones so that drones can be fully charged and reach service destinations quickly upon receiving service requests or commands.

In the following, an autonomous aerial vehicle (AAV) or a drone, used interchangeably, is a vehicle that can fly without human operator on board the vehicle.

This invention discloses a distributed parking system for drones comprising a network of parking pads distributed over a geographic area, each of which comprising a parking surface of one or more parking spots on which a drone can land and park securely, a power refill module that replenish the power source of a parked drone, a control module that controls functions of the parking pad, and a communication module through which the control module is connected to a communication network; and a master controller that controls the functions of the parking pads and communicates commands to and receives reports from the parking pads through the communication network. The communication module of some or all of the parking pads can connect to the communication network through a co-located mobile network base station or wireless access point, or shares the same network connection with them, e.g., the same backhaul or fronthaul cable or optical fiber.

The parking surface of a parking pad can have special markings on the them to guide an approach drone to park properly to ensure the correct operation of the power refill module. A protective box is provided that, under the control of the control module, opens to allow a drone to land and park on or take off from the parking surface, and closes to prevent access and/or to secure and protect a parked drone. The distributed parking system may have an authentication module which authenticates an approaching drone wherein the control module opens a closed protective box to allow the approaching drone to land and park after the control module receives a message from the authentication module that the approaching drone's identity is authenticated and the drone is allowed to land and park at the parking pad. An accounting module may be used to charge an amount of value from an account associated with the drone's owner and/or the drone's user for the use of the parking pad.

The power refill module can be a wireless electrical charger that wireless charges the battery pack of a parked drone or an electrical contact-based charger with two or more electrical contact areas of two opposing polarities which charges a parked drone when the drone is parked properly and establishes electrical connections between the corresponding electrical contact areas of the drone and of the power refill module. The power refill module detects the polarities of the connected electrical contact areas of the drone and switches the polarity of the two or more electrical contact areas of the power refill module to match the polarities of corresponding electrical contact areas of the drone to ensure proper charging of the drone's battery. The space separating the two or more electrical contact areas of two opposing polarities of the electrical contact-based charger can contain one or more drains and pathways that prevent shorting of the contact areas of two opposing polarities by accumulation of liquid. The power refill module may further comprise an electric short detection and protection circuit that detects whether there is a short and cuts off the power supply to the electrical contact based charger when a short is detected. The power refill module can also comprise a robotic arm and a storage of one or more refilled power pack wherein the robotic arm removes a power pack on a parked drone and replaces it with a new or refilled power pack from the storage.

This invention also includes a distributed drone system comprising a network of parking pads distributed over a geographic area, each of which comprising a parking surface of one or more parking spots on which a drone can land and park securely, a power refill module that replenish the power source of a parked drone, a control module that controls functions of the parking pad, and a first communication module through which the control module is connected to a communication network; a plural of drones each comprising a wireless communication module that communicates to one or more wireless networks, a drone authentication module that communicates with a parking pad through the wireless communication module to establish authentication and authorization or permission for the drone to park and/or refill power source at the parking pad, and a controller that communicates with a parking pad on which it is to be parked or already parked to control the drone's actions on landing, while parked and on takeoff from the parking pad; and a master controller comprising a second communication module that communicates with the drones and the distributed parking pads through one or more communication networks, a drone planner module that plans the actions and tasks assignments of the drones in the system including when and on which parking pads to park and refill power, when and where to fly to and actions to take while in flight, a drone controller that communicates commands to and receives status reports from the drones through the second communication module, and parking pad controller that monitors the status and controls the actions of the distributed parking pads through the second communication module.

This invention further includes a method for providing parking and power refill services to drones comprising providing a network of secured parking pads distributed over a geographic area for drones to park and/or refill power; communicating with on one or more drones in the geographic area of the network of secured parking pads to receive requests for parking and/or power refill from the one or more drones, wherein communication is through a wireless communication module on each of the drones; communicating with the network of secured parking pads through their communication modules to monitor their status; based on requests from the one or more drones, sending instructions to the drones and the parking pads to inform them which drone is authorized to park at which parking pad; using wireless communication with a drone approaching a parking pad to authenticate the identity of the drone and to verify whether it is authorized to park at the parking pad; if the drone is allowed to park at the parking pad, making the parking pad accessible to the drone for it to land and park; and replenishing the power pack of the drone parked on the parking pad if the drone needs power refill.

DETAILED DESCRIPTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus or system element for performing the method step. Depending upon the implementation, the corresponding apparatus element may be configured in hardware, software, firmware or combinations thereof.

Figure 2:
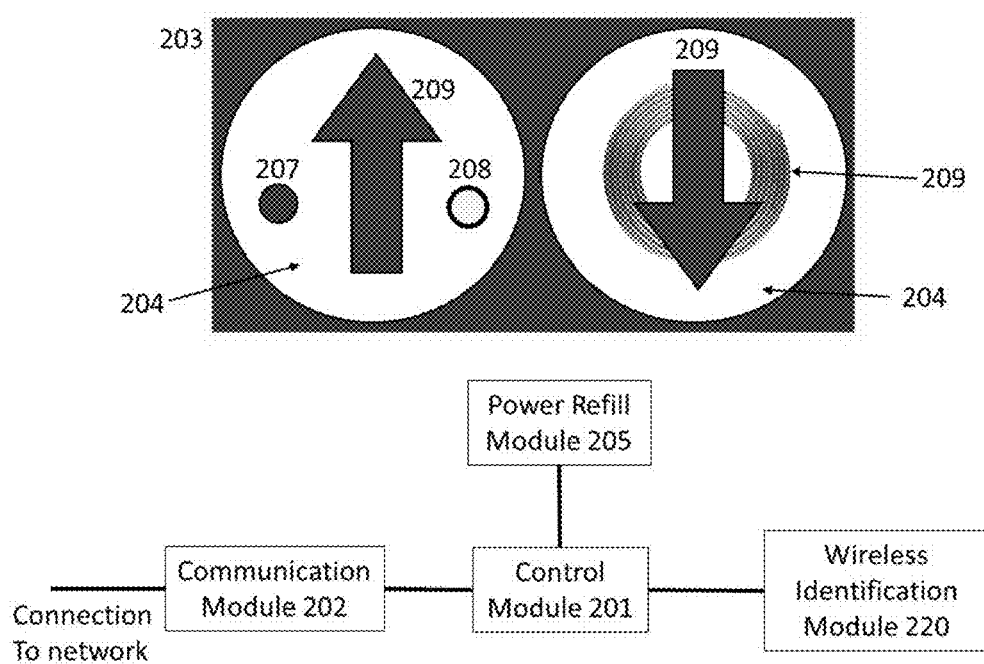
FIG. 2 shows an embodiment of a parking pad and a parking surface with two parking spots, one with electric contact-based charger and one with a wireless charger.

This invention includes a system and method for a network of secure parking pads 101 for drones 102 distributed over a geographic service area wherein the pads 101 are connected to a communication network 103, e.g., a private network or the Internet, either through wired connection, e.g., optical fiber or cable connection, or wireless, e.g., LTE or 5G wireless network, or Wifi network, as illustrated in FIG. 1. The network of distributed parking pads provides parking and power recharge service to drones so that drones can be fully charged and reach service destinations quickly upon receiving service requests or commands. A parking pad, shown in FIG. 2, further comprises control module 201 which is connected to a communication network 103 through a communication module 202, either wired or wireless, a parking surface 203 with one or more parking slot 204 each of which is for parking one drone, and has a power refill module 205 to automatically refill the power pack of a drone 106 parked at the slot in many or all cases. The control module 201 controls the power refill, e.g., electrical charging or gasoline refueling, of each parked drone, and controls the opening or closing of the parking pad or a parking slot, the start or end of charging or refueling. A power refill module may be a wireless charging module on the parking pad, e.g., a wireless charging coil 209 for inductive wireless charging, and a corresponding wireless charging module 108 on the drone 106, or an electrical contact-based charger with charging contacts of two polarities 207 and 208 on the surface of the parking slot and the corresponding charging contacts 109 and 110 on a parked drone. Electrical contacts based charging, or wired charging, avoids the need of a wireless charging module 108 on the drone, thus reduces weight of the drone and increases its power efficiency. An example of electrical contact charging mechanism comprises a first contact area 207 of a first polarity on one part of the parking surface and a second contact area 208 of a second and opposite polarity on another part of the parking surface. Each of the first and second contact areas may comprise multiple areas. The two contact areas can be on two sides of the parking surface or one in the center area and another as a ring around the side. Each of the two contact areas of the parking surface is designed such that when a drone is parked on the parking surface, each will be in contact with one foot or charging extension of a parked drone wherein the bottom of a drone foot or charging extension is an electrical contact. To prevent shorting of the two contact areas while charging in case water enters parking pad, the two contact areas are separated by a space that is lower than both contact area surfaces and one or more water drains are placed in the separation space. As a result, water level will not be able to raise to the surface of the two contact areas and create an electrical short among them. To prevent risk of electric short, an electric short detection and protection circuit can be used to detect whether there is a short and cuts off the power supply to the electrical contact-based charger when a short is detected.

In one embodiment, the polarity of the two contact areas is fixed, e.g., the first polarity is positive and second polarity is negative. In another embodiment, the polarity of the two contact areas is switchable. After a drone is landed, a polarity sensor circuit detects the polarity of the two contacts of the drone battery, and controls one or more switches to connect the correct charging polarity to the two contact areas. Two contact areas above is one example implementation, it is easy to generalize this to multiple contact areas for charging, with one set of contact areas for one polarity and the rest for the opposite polarity. The number and placement of the contact areas are designed to facilitate automatically establish electrical contacts for charging when a drone lands on the parking pad. In another embodiment, a drone and a parking pad are equipped with wireless modules and use the wireless module to communicate where, when and/or how to land the drone on the parking pad. Either one or both may be further equipped with one or more sensors and/or cameras that provide feedback of the relative position and/or orientation of the drone and pad and use the sensory feedback to control the landing and parking of the drone. In the case of a drone equipped with one or more cameras, the drone uses a computer vision module to detect pad surface and measure it distance and orientation relative to the drone, and sends this feedback to a control module that controls the landing and parking of the drone to ensure proper landing position and orientation for wireless charging, or additionally proper contacts for wired or contact-based charging. A parking pad may further comprise special markings 210 which are to be detected and processed by the drone's computer vision module to ensure proper landing and parking of the drone.

In one embodiment, drones may be powered by liquid fuels, e.g., gasoline, and the power refill module comprises a fuel refill nozzle and a liquid fuel storage wherein the power refill module refills a fuel tank on the drone using the fuel refill nozzle into and the liquid fuel storage. The power refill module refills the fuel by inserting a refill nozzle into an opening into a drone's fuel tank. In another embodiment, a drone is powered by an exchangeable power pack and the control module 201 will control a mechanism, e.g., robotic manipulator, to remove the run-down power pack from the drone and install a full power pack. An exchangeable power pack can be a battery or fuel cell or a pack similar to a battery or fuel cell containing other power source.

Figure 3:
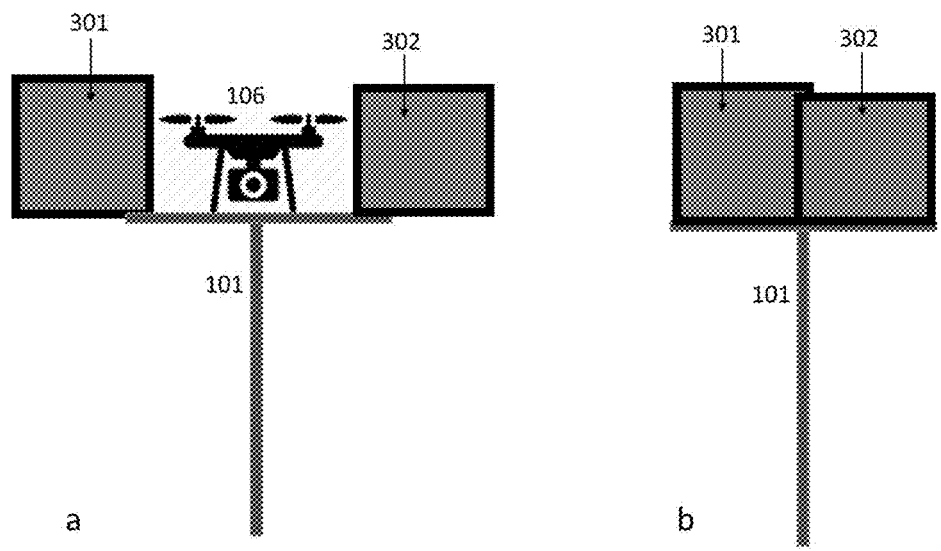
FIG. 3 shows an embodiment of a protective box of a parking pad with an open state in FIG. 3a and a closed state in FIG. 3b.
Figure 4:
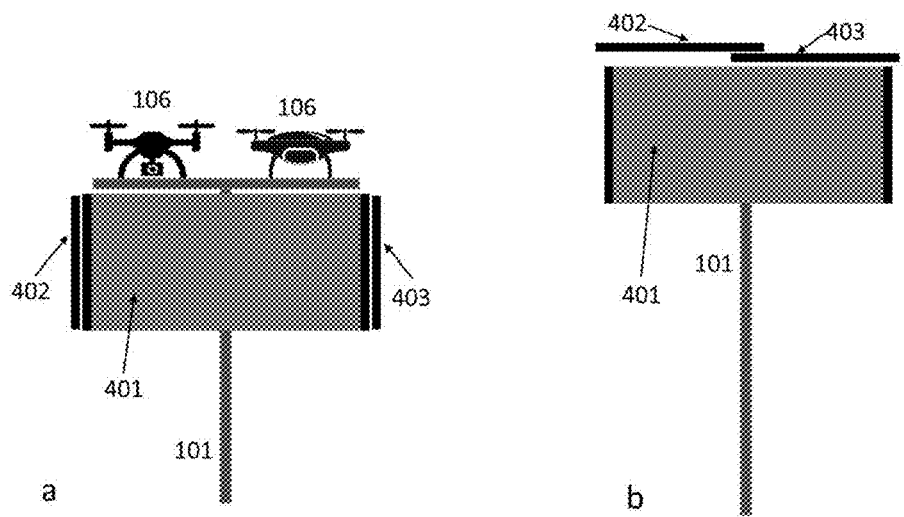
FIG. 4 shows another embodiment of a protective box of a parking pad with an open state in FIG. 4a and a closed state in FIG. 4b.
Figure 5:
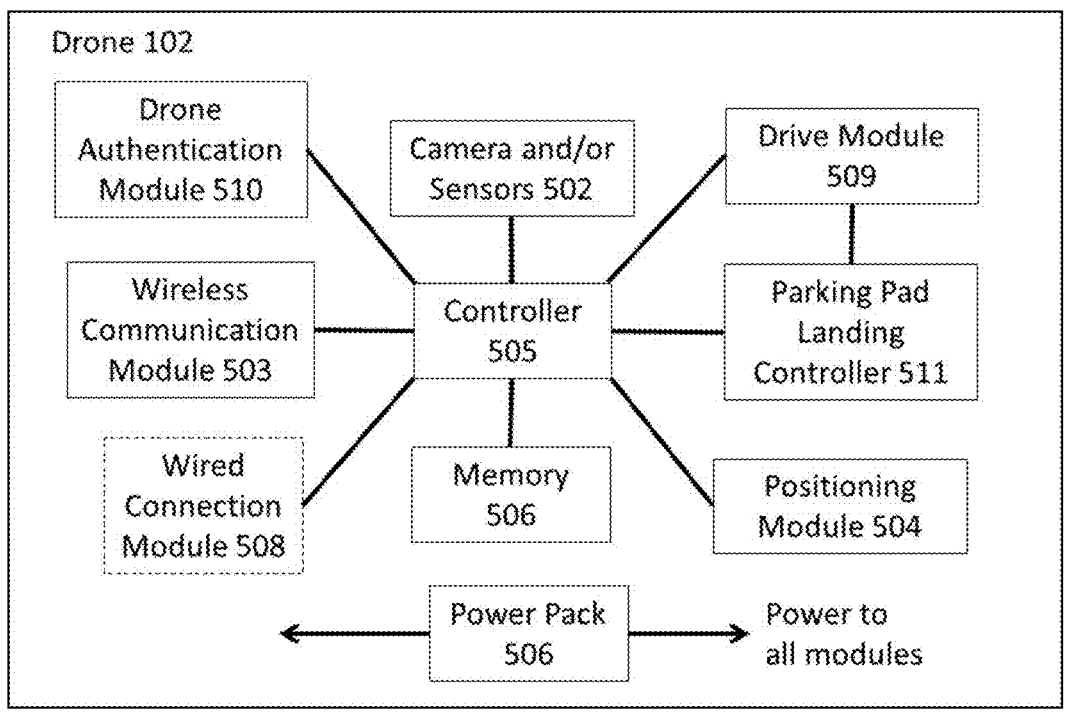
FIG. 5 shows an embodiment of a drone in the distributed drone system that can use the parking and power refill services provided by the distributed parking pads.
Figure 6:
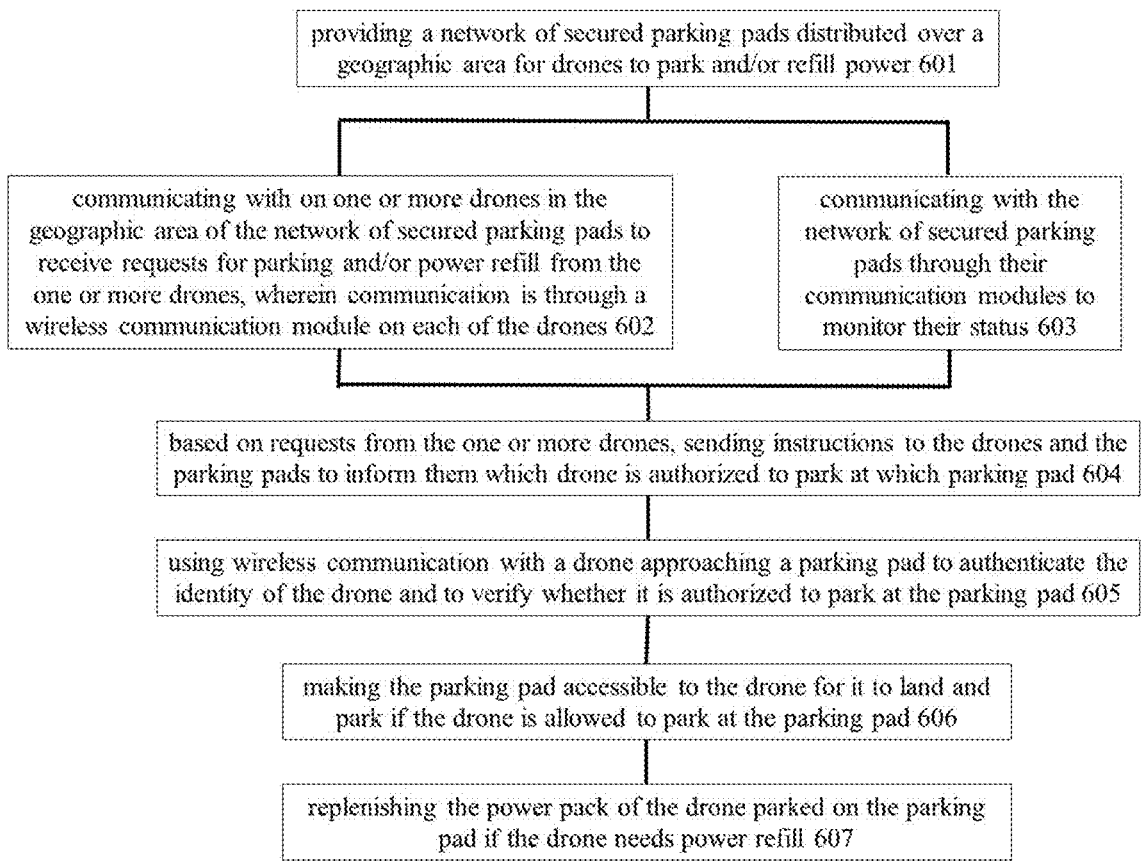
FIG. 6 shows a method of providing parking and power refill services to drones in a geographic area

A parking pad further comprises a wireless identification module 220 that identifies and/or authenticates a drone that is approaching the pad or within the range of communication with the pad whether it should be accepted for parking, charging and/or connection with the communication network. If a drone is accepted for parking, the parking pad will be made accessible to the drone. A parking pad may use a protective box to protect parked drone(s) and/or restrict access to the parking pad. In one embodiment, the protective box is a sideway splitting box as illustrated in FIG. 3. In another embodiment, it is an up-down sliding box as illustrated in FIG. 4. In either case, the box is normally closed and locked, either with or without one or more drones parked inside and being charged or refueled if needed. A sideway splitting box comprises two halves 301 and 302, each half can be rotated down or pushed out from the middle to open up to exposed a parking spot as shown in FIG. 3a, and rotated back up or pulled back together to close as shown in FIG. 3.b, and be locked is needed, to protect a drone parked inside or restrict the access of a vacant parking spot. The rotating down and up or pushed out and pull in can be achieved using one or more linear actuators or rotating motors, under the control of the control module 201. A up-down box structure may contain a box 401 with an open top and open bottom which is lowered by a linear actuator to open the pad for drone landing or take-off as illustrated in FIG. 4a, or raised by moving the linear actuator in the opposite direction to close the pad as illustrated in FIG. 4b. To close the pad, a flexible multi-sectional sliding door, much like a multi-sectional sliding garage door is used. The sliding door can have two parts, 402 and 403, each on one opposite side of the box, driven by one or more linear actuators. The two parts are slid to the sides of the box when the pad is in open mode as shown in FIG. 4a, or be slid to the top of the box when it in the closed mode as shown in FIG. 4b. A one-sided sliding door can be used also, as well as other mechanisms for opening and closing a pad. Each linear actuator is controlled by the control module 201. Yet another embodiment of the protective box is a dome structure which contains two quarter domes that are opened by rotating the two quarter domes around rotation axes at either end of a parking pad for drone landing or take-off, and closed by rotating in the opposite direction. Each rotation axis can be driven by an electric motor which is controlled by the control module 201.

When a pad is in the closed state, it protects the interior of the pad, either with or without a drone parked inside, makes the pad inaccessible to drones to prevent an unrecognized or unauthenticated drone from entering the pad. In one embodiment, the closed state is rain and wind proof to protect a parked drone from the environment, e.g., rain, wind or dust, it can also be locked to protect a parked drone from theft or vandalism. In another embodiment, a parking pad further comprises temperature and/or airflow control modules that monitors and controls the interior of a parking pad in the closed state to keep the interior in desired operating temperature, or optimal charging temperature. When an approaching drone is accepted for parking, wherein the acceptance process may include identification, authentication, authorization and/or accounting of service charge payment from the drone's owner or user, the control module 201 instructs a microcontroller to open the parking pad or a parking slot for the drone to land. Furthermore, if charging or refueling is requested and approved, the control module 201 initiates and completes the charging or refueling after the drone is landed.

A drone is likely to accumulate dusts and debris while in service which may hinder its performance and may block the lens of its on-board camera(s). In one embodiment, the pad further comprises a cleaning module that cleans a parked drone, e.g., using pressured air streams or cleaning liquid streams while holding down the drone to keep it in position.

One embodiment is a system comprising the above described network of parking pads; a plural of drones each of which are equipped with one or more cameras and/or other sensors 502, a wireless communication module 503, a positioning module 504 to determine its position, a controller 505 that controls the functions of the drone, one or more memory devices 506 to store programs and data, and a power source, i.e., power pack 507, a drive module 509 to provide the mechanical propulsion, a drone authentication module 510 that communicates with a parking pad through the wireless communication module 503 to establish authentication and authorization or permission for the drone to park and/or refill power source at the parking pad, and a parking pad landing controller 511 that receives permission from a parking pad and controls the landing on the parking pad with the proper position and orientation as required for the parking pad; and a master controller comprising one or more manager node or drone planner module that plans the distribution of the drones, monitors the status and control the actions of the drones and the parking pads, assigns which drone parks at which parking pad and which drone is to respond to which service request. Furthermore, a master controller may comprises a second communication module that communicates with the drones and the distributed parking pads through one or more communication networks, a drone planner module that plans the actions and tasks assignments of the drones in the system including when and on which parking pads to park and refill power, when and where to fly to and actions to take while in flight, a drone controller that communicates commands to and receives status reports from the drones through the second communication module, and parking pad controller that monitors the status and controls the actions of the distributed parking pads through the second communication module.

Examples of other sensors 502 include chemical sensors, water sensors, airflow or wind direction and speed sensors, microphone or sound (audible frequency range or beyond) sensors, spectrum analyzers, wireless signal detectors, etc. The controller may use the wireless communication module 503 to transmit images or video from the camera to a wireless network, or alternatively stores images or video in one of the one or more memory devices 506 onboard the drone and transmits to a networked server when the drone is parked on a parking pad. The network of parking pads may provide a wired network connection that automatically inserts a network connector into a parked drone which has an optional wired connection module 508 for wired secure transfer of information stored on the drone to the network server, and/or to securely transfer commands, programs or software/firmware updates to the drone. In one embodiment, a drone is designed to only accept commands, programs or software/firmware updates from a secured connection from the parking pad while parked on the parking pad. This reduces the risk of someone hacking into the drone through its wireless communication module 503 to change its programs or software/firmware. The controller 505 uses the positioning module 504 to determine the position of the drone, wherein the positioning module 504 uses a satellite-based positioning system such as GPS or BeiDou, an inertial navigation system (INS), or by fusing the information from a satellite-based position system, the INS and/or a wireless network to which the drone is communicating to further enhance the determination of the position of the drone. The INS may comprise an accelerometer and a gyroscope, sometimes a magnetometer, and calculate the position, the orientation, and the velocity of the drone. The drone reports its current position back to one or more manager nodes using the drone's onboard wireless communication module 503. The wireless communication module 503 can be a terminal device of a widely deployed cellular system such as an LTE or 5G mobile network, or a dedicated wireless network system. Some or all the parking pads can include or be co-located with a wireless network access point or mobile network base station (all referred to as AP) and the parking pads and/or drones use their network connection, e.g., backhaul or fronthaul connections, to connect to a wide area network and the master controller and become accessible through the wide area network or Internet remotely. In another embodiment, each drone has a home pad to which it always returns, unless otherwise instructed by the master controller.

A drone in this invention comprises a wireless communication module that transmits and receives data via one or more wireless networks and receives from a master controller assignment of a parking pad on which the drone may park and/or refill power; one or more sensors the collects sensory data and transmit the data via the one or more wireless network while the drone is in flight or download the data via a connection with the parking pad on which it is parked; a drone authentication module that communicates with a parking pad through the wireless communication module to establish authentication and authorization or permission for the drone to park and/or refill power source at the parking pad; a parking pad landing controller that receives permission from a parking pad and controls the landing on the parking pad with the proper position and orientation as required for the parking pad; and a refillable or exchangeable power pack with an interface to mate with a power refill module on a parking pad that replenishes the power park of the drone when it is parked on the parking pad.

In one embodiment, to ensure continuous availability, some or all of the parking pads have two or more parking spots and the master controller distribute the drones such that two or more drones are assigned to park at each of these parking pads. The master controller ensures there is at least one fully charged standby drone parked at a parking pad when one or more drones from the parking pads are flying in response to a service request or assignment. When the flying drone runs low on power or fuel, it returns to one of the parking pads with a vacant parking spot, which may or may not be the parking pad from which it last took off, and a standby drone from one the parking pads, which may or may not be the same pad to which the flying drone returned or is returning, takes off to continue the service request. We refer this as a double-buffer relay to maintain continuous availability of drone service in the coverage area of the network of parking pads.

In yet another embodiment, to reduce or eliminate the need of number of drones needed in the above described double-buffer relay, drones are equipped with replaceable battery packs, fuel cells or other power packs, and the parking pads are equipped with an automated power pack replacement robotic arm. After a drone is parked, the robotic arm quickly removes the exhausted power pack and re-install a full power pack so that the drone is available for service with very short interruption.

In one embodiment, the network of parking pads are built along streets and highways to provide a traffic management and emergency response system using drones. Drone(s) parked at a parking pad is responsible for the segment of street or highway adjacent to the parking pad. They may be assigned to patrol the segment periodically, much like a police vehicle patrolling highways now. They can also be dispatched on-demand, e.g., when triggered by sensor conditions or signals, by commands from the master controller, by manual command, or by detection of emergency in the segment. This has significant advantage in emergency response because the drones are nearby and can be at an emergency site within seconds to provide emergency response personnel videos to assessment the situation and provide audio communication with the people involved in the emergency through microphone and speaker installed on the drone. The speaker on the drone can also be used to provide instructions or give warnings to drivers violating traffic regulations, and instructions to victims of traffic accidents and stranded vehicles. The drone may further be equipped with flashing lights, like the flashing lights on police vehicles now, and use the flashing lights to get attention of drivers. This distributed drone system can provide traffic management and emergency response onsite even when the road is jammed full with vehicles wherein a traditional police vehicle and emergency vehicle will have difficulty to reach quickly.

One embodiment of this invention is a method for providing parking and power refill services to drones comprising the following steps or modules: providing a network of secured parking pads distributed over a geographic area for drones to park and/or refill power 601; communicating with on one or more drones in the geographic area of the network of secured parking pads to receive requests for parking and/or power refill from the one or more drones, wherein communication is through a wireless communication module on each of the drones 602 and communicating with the network of secured parking pads through their communication modules to monitor their status 603; based on requests from the one or more drones, sending instructions to the drones and the parking pads to inform them which drone is authorized to park at which parking pad 604; using wireless communication with a drone approaching a parking pad to authenticate the identity of the drone and to verify whether it is authorized to park at the parking pad 605; if the drone is allowed to park at the parking pad, making the parking pad accessible to the drone for it to land and park 606; and replenishing the power pack of the drone parked on the parking pad if the drone needs power refill 607.

The above method may further use a protective box to keep a parked drone secure, wherein the protective box is opened for a drone to land and is closed to prevent access to the parking pad by unauthorized drones and/or to keep a parked drone from unauthorized access and/or from the environment, include charging an amount of value from an account associated with the parked drone's owner and/or the parked drone's user for the use of the parking pad, or connect the communication module of some or all of the parking pads to a communication network using the network connection of a co-located mobile network base station or wireless access point.

In the above method, replenishing the power pack may comprise charging a battery pack of a parked drone using a wireless electrical charger or an electrical contact-based charger with two or more electrical contact areas of two opposing polarities on the parking pad, or using a robotic arm installed on the parking pad to remove a power pack on the parked drone and replace it by reinstalling a refilled power pack from a storage.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. A distributed parking system for drones comprising
a network of parking pads for drones distributed over a geographic area, each of which comprising a parking surface of one or more parking spots on which a drone can land and park securely, a power refill module that replenish the power source of a parked drone, a control module that controls functions of the parking pad, and a communication module through which the control module is connected to a communication network;
a master controller that controls functions of the parking pads and communicates commands to and receives reports from the parking pads through the communication network;
a protective box that, under the control of the control module, opens to allow a drone to land and park on the parking surface, and closes to prevent access of a drone; and
an authentication module in each parking pad that authenticates an approaching drone wherein the control module opens a closed protective box to allow the approaching drone to land and park after the control module receives a message from the authentication module that the approaching drone's identity is authenticated and the drone is allowed to land and park at the parking pad.

2. The distributed parking system of claim 1 further comprising an accounting module which charges an amount of value from an account associated with the drone's owner and/or the drone's user for the use of the parking pad.

3. The distributed parking system of claim 1 wherein the power refill module is a wireless electrical charger that wireless charges the battery pack of a parked drone.

4. The distributed parking system of claim 1 wherein the power refill module is an electrical contact-based charger with two or more electrical contact areas of two opposing polarities which charges a parked drone when the drone is parked properly and establishes electrical connections between the corresponding electrical contact areas of the drone and of the power refill module.

5. The distributed parking system of claim 4 wherein the power refill module detects the polarities of the connected electrical contact areas of the drone and switches the polarity of the two or more electrical contact areas of the power refill module to match the polarities of corresponding electrical contact areas of the drone to ensure proper charging of the drone's battery.

6. The distributed parking system of claim 4 wherein the space separating the two or more electrical contact areas of two opposing polarities of the electrical contact-based charger contain one or more drains and pathways that prevent shorting of the contact areas of two opposing polarities by accumulation of liquid.

7. The distributed parking system of claim 4 the power refill module further comprising an electric short detection and protection circuit that detects whether there is a short and cuts off the power supply to the electrical contact-based charger when a short is detected.

8. The distributed parking system of claim 1 wherein the power refill module further comprises a robotic arm and a storage of one or more refilled power pack wherein the robotic arm removes a power pack on a parked drone and replaces it with another power pack from the storage.

9. The distributed parking system of claim 1 wherein the power refill module comprises a fuel refill nozzle and a liquid fuel storage wherein the power refill module refills a fuel tank on the drone using the fuel refill nozzle into and the liquid fuel storage.

10. The distributed parking system of claim 1 wherein the communication module of some or all of the parking pads connect to the communication network using the network connection of a co-located mobile network base station or wireless access point.

11. The distributed parking system of claim 1 further comprising a cleaning module that cleans a drone parked on the parking pad.

12. A distributed drone system comprising
a network of parking pads distributed over a geographic area, each of which comprising a parking surface of one or more parking spots on which a drone can land and park securely, a power refill module that replenish the power source of a parked drone, a control module that controls functions of the parking pad, a first communication module through which the control module communicates with one or more drones and connects to a communication network, a protective box that, under the control of the control module, opens to allow a drone to land and park on and closes to prevent access to the parking pad; an authentication module that authenticates an approaching drone wherein the control module opens the protective box to allow the approaching drone to land and park after the control module receives a message from the authentication module that the approaching drone's identity is authenticated and the drone is allowed to land and park at the parking pad;
a plural of drones each comprising a wireless communication module that transmits and receives data via one or more wireless networks, a drone authentication module that communicates with a parking pad through the wireless communication module to establish authentication and authorization or permission for the drone to park and/or refill power source at the parking pad, and a controller that communicates with a parking pad on which it is to be parked or already parked to control the drone's actions on landing, while parked and on takeoff from the parking pad; and, a master controller comprising a second communication module that communicates with the drones and the distributed parking pads through one or more communication networks, a drone planner module that plans the actions and tasks assignments of the drones in the system including when and on which parking pads to park and refill power, when and where to fly to and actions to take while in flight, a drone controller that communicates commands to and receives status reports from the drones through the second communication module, and parking pad controller that monitors the status and controls the actions of the distributed parking pads through the second communication module.

13. The distributed drone system of claim 12 wherein the parking pads are distributed along streets and highways to provide a traffic management and emergency response system using the drones.

14. A drone in a distributed drone system comprising a wireless communication module that transmits and receives data via one or more wireless networks and receives from a master controller assignment of a parking pad on which the drone may park and/or refill power wherein the parking pad is in a network of distributed parking pads in a geographic area for drones to park and/or refill power and each parking pad comprises a parking surface of one or more parking spots on which the drone can land and park securely, a parking pad control module that controls functions of the parking pad, and a first communication module through which the parking pad control module is connected to a communication network;

one or more sensors the collects sensory data and transmit the data via the one or more wireless network while the drone is in flight or download the data via a connection with the parking pad on which it is parked;

a drone authentication module that communicates with a parking pad through the wireless communication module to establish authentication and authorization or permission for the drone to park and/or refill power source at the parking pad;

a parking pad landing controller that receives permission from a parking pad and controls the landing on the parking pad with the proper position and orientation as required for the parking pad; and, a refillable or exchangeable power pack with an interface to mate with a power refill module on a parking pad that replenishes the power park of the drone when it is parked on the parking pad.

15. The drone of claim 11 wherein the refillable or exchangeable power pack is a rechargeable battery and the interface comprises contact surface areas through which electrical connection will be established with an electrical charger on a parking pad after the parking pad landing controller lands and parks the drone on the parking pad, or the interface comprises a wireless charging circuit through which the rechargeable battery is charged by a wireless electrical charger on a parking pad after the parking pad landing controller lands and parks the drone on the parking pad.

16. The drone of claim 11 wherein the refillable or exchangeable power pack is a liquid fuel tank and the interface is fuel refill opening through which the power refill module inserts a nozzle to refill the tank after the parking pad landing controller lands and parks the drone on the parking pad.

17. The drone of claim 11 further comprising a speaker through which audio signals can be generated to provide instructions.

18. A method for providing parking and power refill services to drones comprising providing a network of secured parking pads distributed over a geographic area for drones to park and/or refill power;

communicating with on one or more drones in the geographic area of the network of secured parking pads to receive requests for parking and/or power refill from the one or more drones, wherein communication is through a wireless communication module on each of the drones;

communicating with the network of secured parking pads through their communication modules to monitor their status;

based on requests from the one or more drones, sending instructions to the drones and the parking pads to inform them which drone is authorized to park at which parking pad;

using wireless communication with a drone approaching a parking pad to authenticate the identity of the drone and to verify whether it is authorized to park at the parking pad;

if the drone is allowed to park at the parking pad, making the parking pad accessible to the drone for it to land and park; and, replenishing the power pack of the drone parked on the parking pad if the drone needs power refill.

19. The method of claim 18 further comprising using a protective box to keep a parked drone secure, wherein the protective box is opened for a drone to land and is closed to prevent access to the parking pad by unauthorized drones and/or to keep a parked drone from unauthorized access and/or from the environment.

20. The method of claim 18 further comprising charging an amount of value from an account associated with the parked drone's owner and/or the parked drone's user for the use of the parking pad.

21. The method of claim 18 wherein replenishing the power pack comprising charging a battery pack of a parked drone using a wireless electrical charger or an electrical contact-based charger with two or more electrical contact areas of two opposing polarities on the parking pad, refilling the fuel tank of a parked drone, or removing a power pack on the parked drone and replacing it with another power pack from a storage.

* * * * *